July 24, 1956  R. SAVORY  2,756,045
REAR WHEEL SUSPENSIONS FOR MOTORCYCLES
Filed June 2, 1953  2 Sheets-Sheet 1
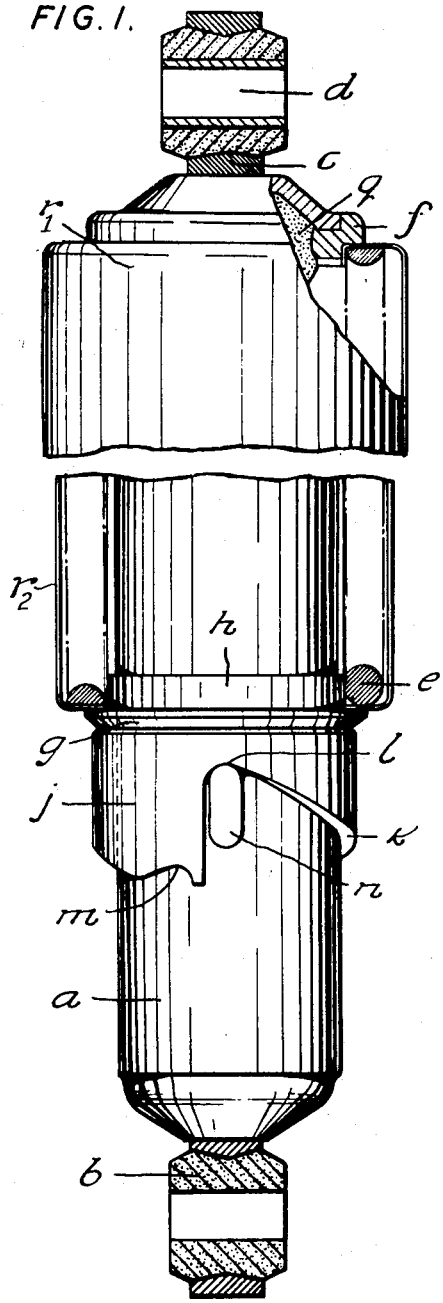
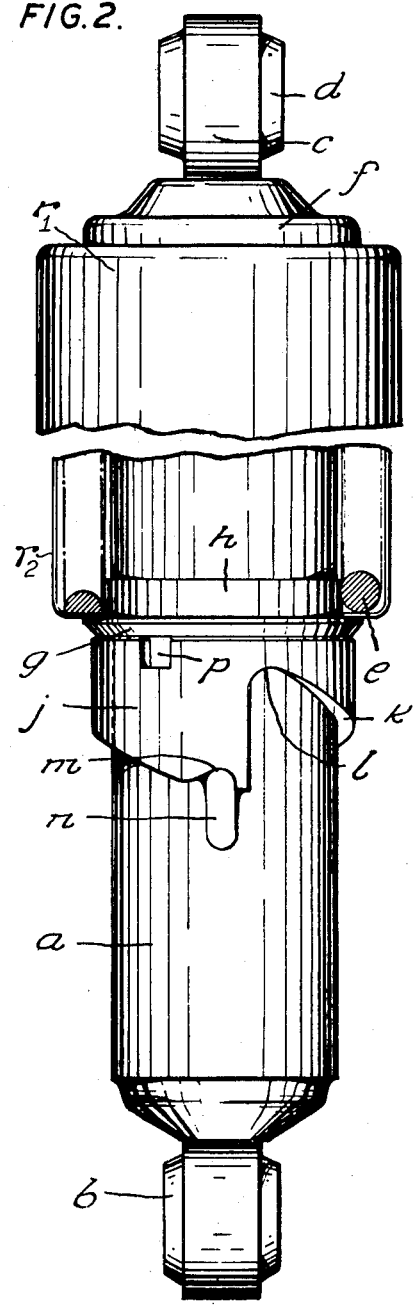
Inventor
RAYMOND SAVORY
by Walter S. Bleston
ATTORNEY Inventor
RAYMOND SAVORY
by Walter S. Bleston
ATTORNEY

United States Patent Office 2,756,045
Patented July 24, 1956

2,756,045

REAR WHEEL SUSPENSIONS FOR MOTORCYCLES

Raymond Savory, Earlswood, near Birmingham, England, assignor to Girling Limited, Birmingham, England, a British company Application June 2, 1953, Serial No. 359,055

6 Claims. (Cl. 267—8)

This invention relates to improvements in rear wheel suspensions for motorcycles of the type in which the wheel or a pivoted fork or equivalent part carrying the wheel is supported at each side by a compression spring combined with a telescopic hydraulic damper by which the movements of the wheel are controlled and damped.

One of the main difficulties in designing a rear suspension for a motorcycle is the very large variation in the static loading on the wheel according to whether or not a pillion passenger is carried, and one of the objects of our invention is to provide simple and effective means for adjusting the suspension as required.

According to my invention, in a suspension unit for the rear wheel of a motorcycle comprising a coiled compression spring in combination with a telescopic hydraulic damper the spring fits over the body of the damper and abuts between a collar on the piston-rod of the damper and a sleeve or ring of which the axial position on the body of the damper is adjustable by moving it angularly and which is positively located in each of two or more positions.

In one practical arrangement the spring abuts against the upper end of a sleeve or ring which is axially and angularly slidable on the body of the damper, and the lower end face of the sleeve or ring is formed with two or more axially and angularly spaced notches or recesses cooperating with a lug or projection on the body.

Thus by moving the sleeve or ring angularly different notches or recesses can be brought into engagement with the lug or projection on the body to vary the axial position of the sleeve or ring and hence the initial loading or compression of the spring in accordance with the load which it will have to support.

Normally there will be two diametrically opposed lugs or projections on the body co-operating with complementary pairs of notches or recesses in the end of the sleeve or ring so as to eliminate unbalanced side thrust on the sleeve or ring.

In an alternative construction the sleeve or ring is formed in two parts which are angularly movable relative to each other and the axially and angularly spaced notches or recesses and the lug or projection are formed on the adjacent end faces of the two parts of the sleeve or ring so that the effective axial length of the sleeve or ring which forms an abutment for the spring is adjustable.

Two practical forms of my invention are illustrated by way of example in the accompanying drawings in which:

Figure 1 is a side elevation in part section of a suspension unit embodying my invention, the spring being in its position of least initial compression.

Figure 2 is a similar side elevation showing the spring in its position of maximum initial compression.

In the construction shown in Figures 1 and 2 $a$ is the body of a telescopic hydraulic damper having at its lower end an eye $b$ for connection to the rear wheel spindle of a motorcycle or to a movable part carrying the wheel spindle.

The piston-rod $c$ which is axially movable with respect to the damper body has at its upper end a similar eye $d$ for connection to the frame of the motorcycle.

A helical compression spring $e$ fits over the upper part of the damper to take the load on the wheel and abuts at its upper end on a flanged collar $f$ fixed on the piston-rod $c$. The lower end of the spring abuts on a collar $g$ which is slidable on the body of the damper and has a short spigot $h$ adapted to enter the end coil of the spring. The collar is backed by a sleeve $j$ which is axially and angularly movable on the body.

The lower end face of the sleeve is formed as a cam surface $k$ having two or more diametrically opposed pairs of axially and angularly spaced notches or recesses $l$, $m$, adapted to engage with diametrically opposed lugs or projections $n$ welded or copper brazed to the body of the damper.

For normal riding the upper notches $l$ are in engagement with the lugs $n$ as shown in Figure 1, and when a pillion passenger is carried the sleeve is moved angularly until the lower notches $m$ are in engagement with the lugs as shown in Figure 2, the cam surface $k$ riding on the lug $n$ as the sleeve is moved angularly. The sleeve is thus moved axially upwards on the body of the damper to increase the initial loading or compression of the spring $e$.

For moving the sleeve angularly it may be knurled for engagement by the fingers, but preferably a radial aperture or recess $p$ is formed in the sleeve to receive a key or tommy-bar.

A rubber buffer $q$ may be mounted on the piston-rod of the damper below the collar $f$ to prevent metal-to-metal contact between the collar and the closure for the upper end of the damper body in the event of the spring breaking or being fully compressed by a severe shock.

Preferably the spring is enclosed in a light two partite dust shield or cover of which the one part $r_1$ telescopes within the other part $r_2$. The opposite ends of both parts are flanged and are retained by the ends of the spring.

In a modification the collar $g$ instead of being a separate member may be an integral part of the upper end of the sleeve $j$.

Figure 3:
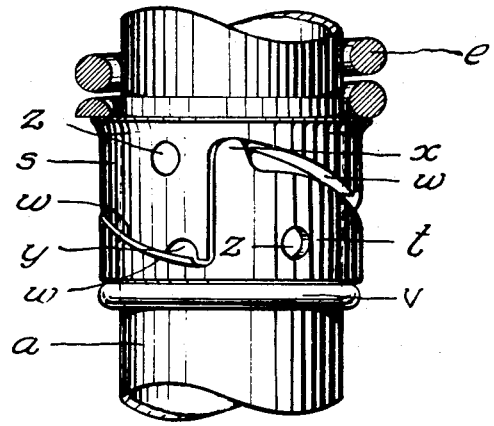
Figures 3 and 4 are fragmentary side elevations of a modified construction embodying a two-part sleeve or ring, the drawings showing the sleeve or ring in its two operative positions.
Figure 4:
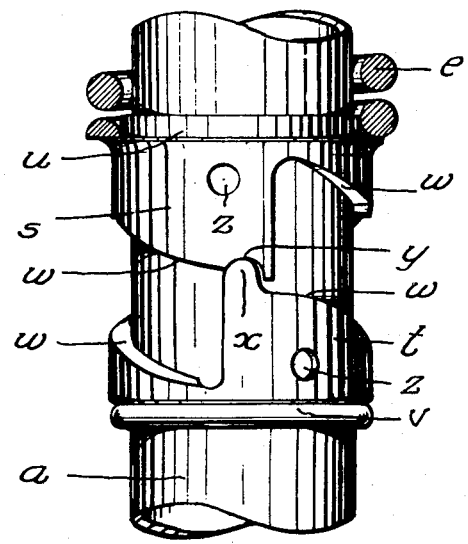

In the alternative construction shown in Figures 3 and 4 the sleeve which forms an abutment for the lower end of the spring $e$ is formed in two parts $s$ and $t$ which are angularly movable relative to each other.

The upper part $s$ has on its upper end a shoulder to receive the lower end of the spring and a short spigot $u$ adapted to enter the end coil of the spring. The bottom end of the lower part $t$ abuts on a fixed collar $v$ which may be integral with or may be welded or otherwise secured to the body of the damper. The adjacent edges of the two parts of the sleeve are formed as complementary cam surfaces $w$, and an axially extending horn or finger $x$ at the higher end of the cam surface on the part $t$ is adapted to engage either with the higher end of the cam surface on the part $s$ as shown in Figure 3 or a notch $y$ adjacent to the lower end of that surface as shown in Figure 4. Holes $z$ are formed in the two parts of the sleeve to receive keys or tommy-bars for moving them angularly.

In each of the forms illustrated the sleeve or the part of it on which the spring abuts has two axially spaced positions in which it is positively located but it will be appreciated that by providing an appropriate number of notches it may have three or more positions.

I claim:

1. A suspension unit of the type described comprising a telescopic hydraulic damper including a body and a piston-rod telescoping into said body, a load-supporting coiled compression spring fitted over said damper body, a collar on said piston-rod providing an abutment for one end of said spring, a sleeve angularly and axially movable on said body and providing an abutment for the other end of said spring, and angularly spaced means for locating said sleeve in a plurality of axially spaced positions.

2. A suspension unit as in claim 1 wherein said sleeve is provided with means to receive a tool for moving it angularly.

3. A suspension unit as in claim 1 wherein said spring is enclosed in a telescopic cover extending between said collar and said sleeve.

4. A suspension unit as in claim 1 wherein the end of said sleeve which provides an abutment for said spring is formed with a spigot adapted to enter the end coil of said spring.

5. A suspension unit of the type described comprising a telescopic hydraulic damper including a body and a piston-rod telescoping into said body, a coiled compression spring fitting over said damper body, a collar on said piston-rod providing an abutment for one end of said spring, a sleeve angularly and axially movable on said body and providing on its one end an abutment for the other end of said spring, a part-helical cam surface on the other end of said sleeve, a lug on said body, and angularly and axially spaced recesses in said cam surface for selective engagement with said lug.

6. A suspension unit of the type described comprising a telescopic hydraulic damper including a body and a piston-rod telescoping into said body, a coiled compression spring fitting over said damper body, a collar on said piston-rod providing an abutment for one end of said spring, two axially spaced sleeves axially and angularly movable on said body, the first of said sleeves providing an abutment for the other end of said spring, a fixed collar on said body providing an abutment for the second of said sleeves, co-operating part-helical cam surfaces on the adjacent ends of said sleeves, and axially and angularly spaced co-operating parts on said adjacent ends for selective engagement to vary the effective combined axial length of said sleeves.

References Cited in the file of this patent

UNITED STATES PATENTS

| 1,006,686 | Schiller | Oct. 24, 1911 |
| 2,004,539 | Rossman | June 11, 1935 |
| 2,163,254 | Binder et al. | June 20, 1939 |